(12) United States Patent
Farah et al.

(10) Patent No.: US 9,421,632 B2
(45) Date of Patent: Aug. 23, 2016

(54) MULTI-OUTPUT ENGINE WELDER SUPPLYING FULL ELECTRICAL POWER CAPACITY TO A SINGLE WELDING OUTPUT

(75) Inventors: Samir F. Farah, Broadview Heights, OH (US); Andreu P. Meckler, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1658 days.

(21) Appl. No.: 12/648,385

(22) Filed: Dec. 29, 2009

(65) Prior Publication Data

US 2011/0155710 A1 Jun. 30, 2011

(51) Int. Cl.
*B23K 9/10* (2006.01)

(52) U.S. Cl.
CPC .................. *B23K 9/1068* (2013.01)

(58) Field of Classification Search
CPC .................. B23K 9/10; B23K 9/1068
USPC ............. 219/133, 134, 137.7, 137.71, 137 PS
See application file for complete search history.

(56) References Cited

U.S. PATENT DOCUMENTS

| 3,829,652 | A | 8/1974 | Terry |
|---|---|---|---|
| 4,293,756 | A | 10/1981 | Hoyt |
| 4,465,920 | A | 8/1984 | Hoyt |
| 4,749,935 | A | 6/1988 | Osborne |
| 4,853,557 | A | 8/1989 | Meier |
| 4,972,064 | A | 11/1990 | Stava |
| 5,166,567 | A | 11/1992 | Kneisley et al. |
| 5,250,786 | A | 10/1993 | Kikuchi et al. |
| 5,637,246 | A | 6/1997 | Ikegami |
| 5,734,147 | A | 3/1998 | Bunker |
| 5,814,788 | A | 9/1998 | Everhart |
| 5,861,604 | A | 1/1999 | McLean et al. |
| 5,864,116 | A | 1/1999 | Baker |
| 5,936,320 | A * | 8/1999 | Takeda et al. ............... 310/89 |
| 5,991,169 | A | 11/1999 | Kooken |
| 6,005,220 | A | 12/1999 | Bunker |

(Continued)

FOREIGN PATENT DOCUMENTS

| CN | 2775919 Y | 4/2006 |
|---|---|---|
| EP | 1086774 | 3/2001 |
| EP | 0763397 | 8/2003 |

OTHER PUBLICATIONS

PCT/IB2010/003359 International Search Report dated May 25, 2011.

(Continued)

*Primary Examiner* — Dana Ross
*Assistant Examiner* — Ayub Maye
(74) *Attorney, Agent, or Firm* — Hahn Loeser & Parks LLP

(57) ABSTRACT

An engine welder having a single rotor and a single stator, and methods of distributing electrical power capacity of the engine welder to various welding windings and auxiliary windings of the engine welder. The single rotor is driven at saturation current and independent control of the welding outputs is accomplished on the stator side of the engine welder. Means for supplying the full electrical power capacity of the engine welder to a single stator welding winding are provided. Furthermore, means for distributing the electrical power capacity of the engine welder between welding windings and/or auxiliary windings of the single stator are provided.

28 Claims, 6 Drawing Sheets

(56) References Cited

U.S. PATENT DOCUMENTS

| | | | |
|---|---|---|---|
| 6,015,964 | A | 1/2000 | Baker |
| 6,121,691 | A | 9/2000 | Renner |
| 6,172,332 | B1 | 1/2001 | Trinkner et al. |
| 6,263,926 | B1 | 7/2001 | Bender et al. |
| 6,296,027 | B1 | 10/2001 | Bender et al. |
| 6,310,320 | B1 | 10/2001 | Kraus |
| 6,310,321 | B1 | 10/2001 | Beeson et al. |
| 6,512,199 | B1 | 1/2003 | Blazina |
| 6,531,685 | B2 | 3/2003 | Smith |
| 6,603,213 | B1 | 8/2003 | Renner |
| 6,621,050 | B2 | 9/2003 | Plantz |
| 6,812,584 | B2 | 11/2004 | Renner |
| 7,112,945 | B2 | 9/2006 | Beeson et al. |
| 7,211,764 | B2 | 5/2007 | Leisner et al. |
| 7,259,355 | B2 | 8/2007 | Bender et al. |
| 2005/0236383 | A1* | 10/2005 | Beeson et al. ............... 219/133 |
| 2006/0037953 | A1 | 2/2006 | Matthews et al. |
| 2007/0187376 | A1* | 8/2007 | Albrecht et al. ........... 219/130.1 |
| 2008/0264922 | A1* | 10/2008 | Fosbinder ................... 219/133 |

OTHER PUBLICATIONS

PCT/IB2010/003359 Written Opinion dated May 25, 2011.

* cited by examiner

US 9,421,632 B2

MULTI-OUTPUT ENGINE WELDER SUPPLYING FULL ELECTRICAL POWER CAPACITY TO A SINGLE WELDING OUTPUT

TECHNICAL FIELD

The claimed invention relates to arc welders and, more particularly, to engine arc welders.

BACKGROUND

A typical engine welder machine includes an internal combustion engine coupled to a generator where the mechanical energy provided by the internal combustion engine is converted to electrical energy by the generator. Traditionally, engine welders provide one or more welding outputs or channels for arc welding along with one or more auxiliary power outputs to support various types of power tools. As a result, one or more users may be able to use the same engine welder at the same time. For some engine welders that provide more than one welding output, users have had to combine the multiple welding outputs in parallel in order to access the full electrical power capacity of the engine welder for a single welding operation. Some engine welders have internal mechanical switches allowing two or more welding channels to be combined in parallel within the engine welder. However, such mechanical switches have to be sized to switch and carry high currents. Switches of this type are costly and prone to failure.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Certain embodiments of the present invention comprise an engine welder having a single rotor and a single stator, and methods of distributing electrical power capacity of the engine welder to various welding windings and auxiliary windings of the engine welder. Sufficient current is provided to the single rotor to fully saturate the generator magnetics, and independent control of the welding outputs is accomplished on the stator side of the engine welder. Means for supplying the full electrical power capacity of the engine welder to a single stator welding winding are provided. Furthermore, means for distributing the electrical power capacity of the engine welder between welding windings and/or auxiliary windings of the single stator are provided.

These and other novel features of the subject matter of the present application, as well as details of illustrated embodiments thereof, will be more fully understood from the following description and drawings.

DETAILED DESCRIPTION

U.S. Pat. No. 5,166,567 to Kneisley et al. is incorporated herein by reference in its entirety as background information and supporting information related to engine welders. The term "welding winding" as used herein can refer to a single conductive coil winding (e.g., a copper coil winding) or a set of conductive coil windings (e.g., a three-phase Y-winding, a three-phase delta-winding, or a star-winding) dedicated to a single welding output of an engine welder. Similarly, the term "auxiliary winding" as used herein can refer to a single conductive coil winding (e.g., a copper coil winding) or a set of conductive coil windings (e.g., a three-phase Y-winding, a three-phase delta-winding, or a star-winding) dedicated to a single auxiliary power output of an engine welder.

Figure 1:
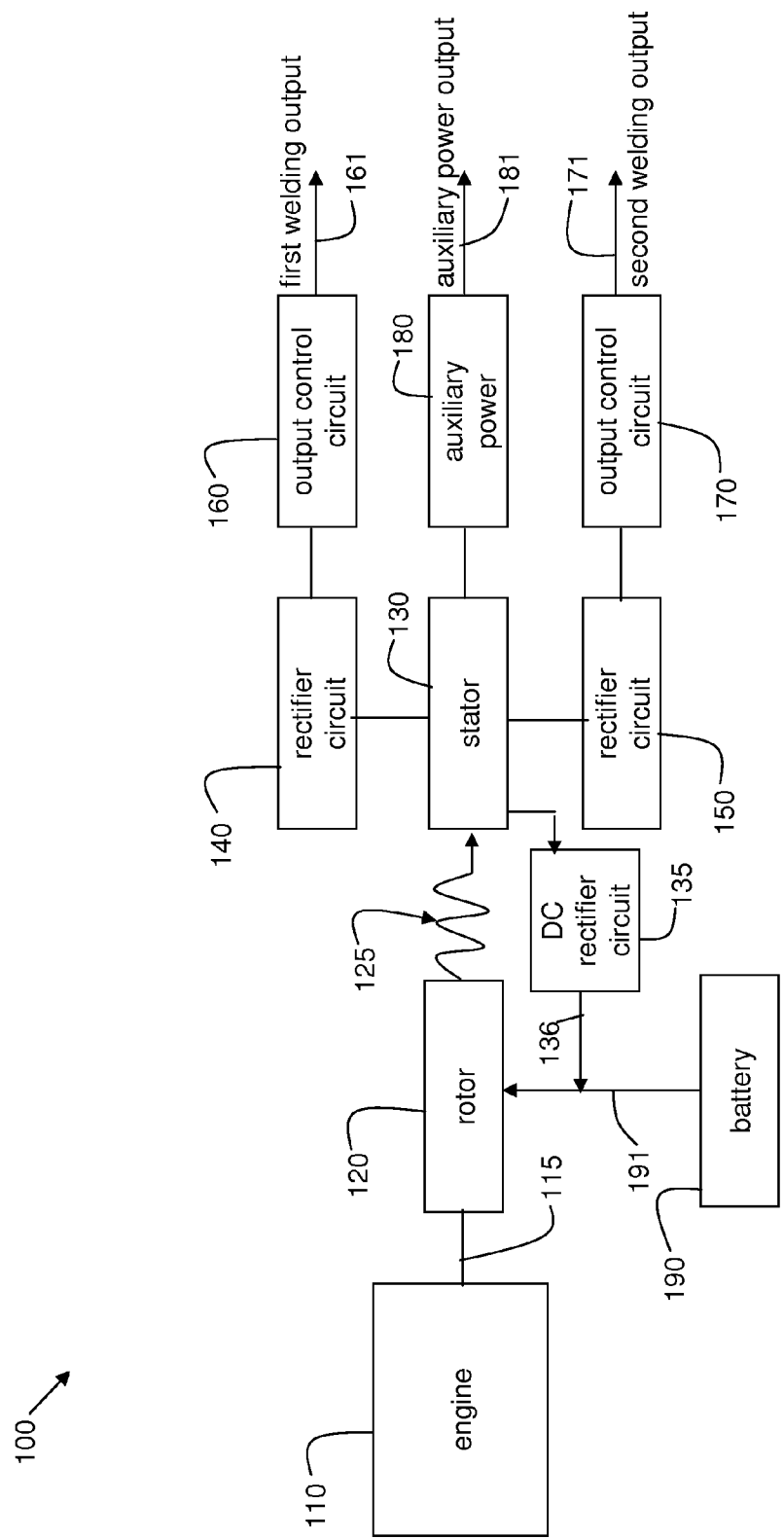
FIG. 1 illustrates a schematic block diagram of an example embodiment of an engine welder.
Figure 2:
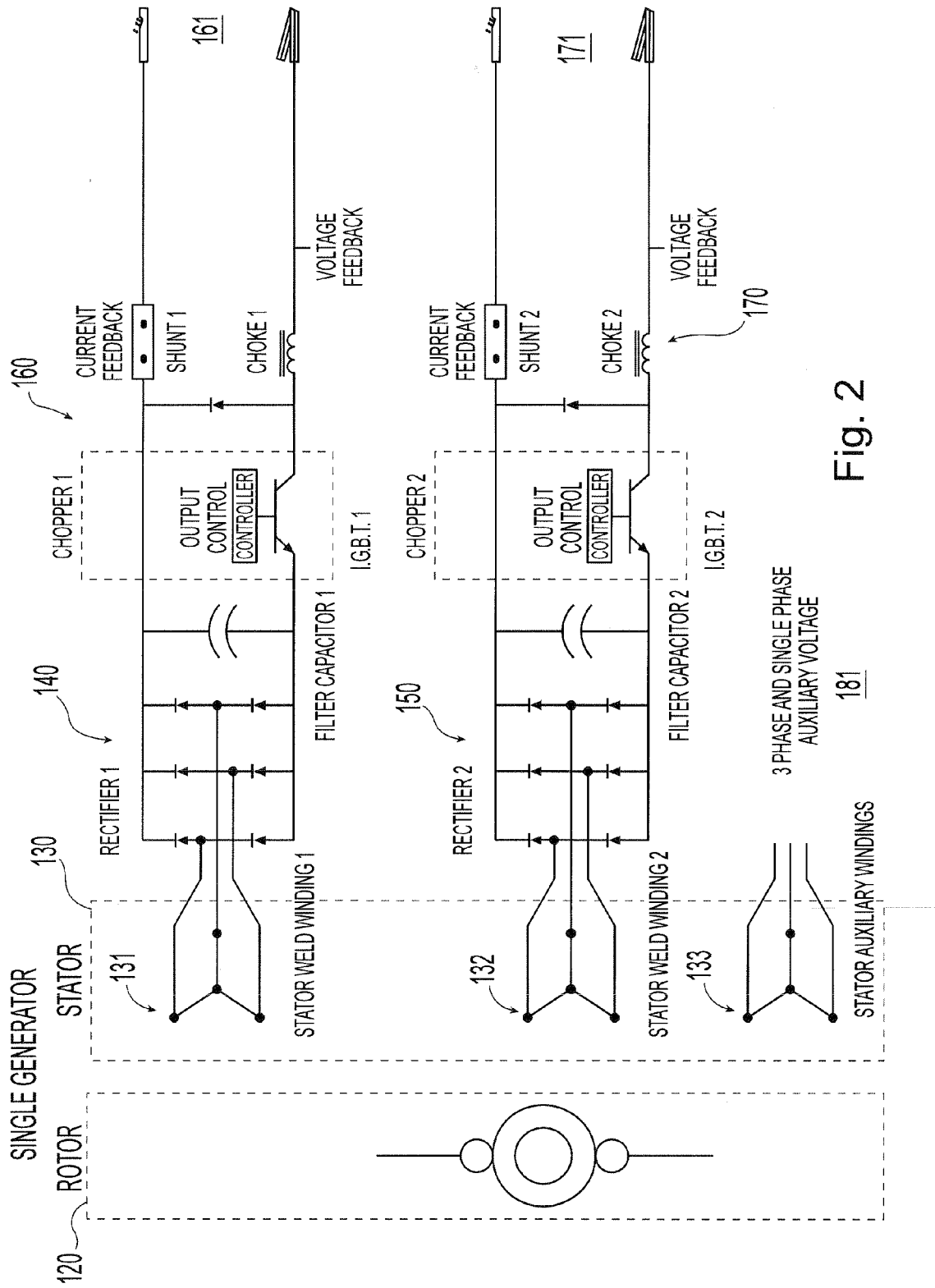
FIG. 2 illustrates a diagram of a portion of the engine welder of FIG. 1, in accordance with an example embodiment.

FIG. 1 illustrates a schematic block diagram of an example embodiment of an engine welder 100. FIG. 2 illustrates a diagram of a portion of the engine welder 100 of FIG. 1, in accordance with an example embodiment. The engine welder 100 includes an engine 110 such as, for example, an internal combustion engine capable of providing rotating mechanical drive power via a rotatable drive shaft 115. In accordance with an embodiment of the present invention, the engine 110 provides about 43 horsepower (HP) of rotating mechanical drive power.

The engine welder 100 also includes a rotor 120 operatively connected to the engine 110 via the drive shaft 115. In accordance with an embodiment of the present invention, the rotor 120 is made of a stack of iron laminations and one or more copper field windings wound on the stack of iron laminations. During operation, the rotor 120 is driven at a current (saturation current) sufficient to fully saturate the generator magnetics and is not used to control the outputs of the engine welder 100. As used herein, the term "saturation current" refers to that current level in the rotor field winding which saturates (i.e., maximizes) the amount of electrical power that is able to be magnetically coupled to a stator winding.

A stator 130 surrounds the rotor 120 (i.e., the rotor 120 is located within the stator 130) and is magnetically coupled 125 to the rotor 120 during operation. In accordance with an embodiment of the present invention, the stator 130 is made of a stack of iron laminations and multiple copper windings wound on the stack of iron laminations. The multiple copper windings include a first stator welding winding 131, a second stator welding winding 132, a first auxiliary winding 133 (see FIG. 2), and a field excitation winding (e.g., field excitation winding 80 shown in U.S. Pat. No. 5,166,567). The output of each stator winding provides a bus of electrical power that can be regulated and controlled. In accordance with other embodiments of the present invention, additional welding windings and/or additional auxiliary windings are provided to support additional welding outputs and/or additional auxiliary power outputs.

At initial start up, a rotor excitation current 191 is fed from a battery 190 to the field winding of the rotor 120 through slip rings of the rotor 120 to initially energize the field winding and induce a magnetic field around the field winding of the rotor 120. This starts inducing voltages on the leads of the stator windings. Subsequently, a rotor excitation current (saturation current) 136 is continuously fed from a field excitation winding of the stator 130, through a DC rectifier circuit 135, to the field winding of the rotor 120 via slip rings of the rotor 120 to continue to induce a magnetic field around the field winding of the rotor 120. Both the current 191 and the current 136 are DC currents, in accordance with an embodiment of the present invention. The induced magnetic field magnetically induces alternating currents in the stator windings as the rotor 120 rotates within the stator 130.

The output of each stator welding winding feeds into its own rectifier circuit. Referring to FIG. 1 and FIG. 2, the first stator welding winding 131 is operatively connected to an input of a first rectifier circuit 140, and the second stator welding winding 132 is operatively connected to an input of a second rectifier circuit 150. Alternating currents magnetically induced in the stator welding windings 131 and 132 via the rotor 120 are rectified to DC currents by the rectifier circuits 140 and 150, respectively. In accordance with an embodiment of the present invention, the rectifier circuits each include a configuration of diodes and a filter capacitor as shown in FIG. 2.

The output of each rectifier circuit feeds into its own output control circuit. Referring to FIG. 1 and FIG. 2, the first rectifier circuit 140 is operatively connected to an input of a first output control circuit 160, and the second rectifier circuit 150 is operatively connected to an input of a second output control circuit 170. The output control circuits 160 and 170 control and regulate the level of the output voltages and output currents produced at the first welding output 161 and the second welding output 171, independently, when a load (e.g., a welding torch) is connected to each of the welding outputs of the engine welder 100. Again, the field windings of the rotor 120 are driven at saturation current and the rotor 120 is not used to control the welding output currents or voltages.

The first output control circuit 160 is capable of controlling a first welding output current over a full range of welding output current levels (e.g., from 0 amps to 500 amps) up to the full electrical power capacity (e.g., 20 KW) of the engine welder 100. The second output control circuit 170 is capable of controlling a second welding output current over a full range of welding output current levels (e.g., from 0 amps to 300 amps), independently of the first welding output current, up to less than the full electrical power capacity (e.g., 10 KW) of the engine welder. Furthermore, each output control circuit 160 and 170 independently controls the wave shapes of the output currents and voltages. When a load (i.e., a welding tool) is operatively connected to one of the welding outputs, the arc produced between an electrode of the welding tool and a workpiece is controlled by controlling the voltage and current according to a defined welding process.

In accordance with an embodiment of the present invention, the output control circuits each include a chopper circuit, followed by a diode and a choke as shown in FIG. 2. Chopper circuits are well known in the art and may include insulated gate bipolar transistors (IGBT), for example, made of silicon material. The chopper circuits receive welding waveforms from, for example, a pulse modulator of the engine welder 100 and are able to control and change the output current and voltage levels of a welding output at a rate of 18 kHz or greater, in accordance with an embodiment of the present invention. Such control allows for sophisticated welding processes to be performed such as, for example, short circuit transfer processes including surface tension transfer arc welding. In accordance with other embodiments of the present invention, the chopper circuits may be replaced with inverter circuits, which are also well known in the art, or with a combination of chopper and inverter circuits to accommodate various welding applications and performance parameters. Other output control circuits are possible as well.

The output of the first auxiliary winding 133 feeds directly to an auxiliary power output 181, or first through an auxiliary power circuit 180 and then to the auxiliary power output 181. The auxiliary power provided by the auxiliary power output 181 may be of several different types. For example, the auxiliary power may be single-phase AC auxiliary power, three-phase AC auxiliary power, or DC auxiliary power. To provide DC auxiliary power, the auxiliary power circuit 180 may include a rectifier and filtering circuit, for example. In accordance with an embodiment of the present invention, several types of auxiliary power outputs are provided including 120 volt (V) single-phase 12 kilowatt (KW) power at 60 Hz, 240 V single-phase 12 kilowatt (KW) power at 60 Hz, and 240V three-phase 20 KW power at 60 Hz, in order to provide power to a connected load (e.g., a power tool). Other embodiments can provide other types of auxiliary power outputs including, for example, 50 Hz configurations.

The full or maximum electrical power capacity is defined herein as the full or maximum amount of electrical power that is capable of being generated by the engine welder 100. The full or maximum electrical power capacity of the engine welder 100 is largely determined by the characteristics of the engine 110, the rotor 120, and the stator 130. In particular, the horsepower provided by the engine and the size (volume, dimensions, stack length of iron laminations, amount of iron) of the rotor 120 and the stator 130, including the amount of copper (or other conductive material) in the windings that are wound on the rotor 120 and the stator 130, largely determine the full or maximum electrical power capacity of the engine welder 100. In general, the more horsepower and the larger the rotor and stator, the greater can be the full electrical power capacity.

In accordance with an embodiment of the present invention, the rotor 120 and stator 130 are sized (i.e., designed) to be able to supply the full or maximum electrical power capacity of the engine welder 100 to the first stator welding winding 131. Furthermore, the rectifier circuit 140 and the output control circuit 160 are capable of providing, in a rectified and controlled manner, the full or maximum electrical power capacity of the engine welder 100 to the first welding output 161. That is, the rectifier circuit 140 and the output control circuit 160 are large enough (e.g., have enough silicon material) to handle the full or maximum electrical power capacity of the engine welder 100.

As a result, a user of the first welding output 161 may perform a welding process using the full or maximum electrical power capacity of the engine welder 100 without having to externally parallel multiple welding outputs together, and without having to rely on any internal mechanical switches within the engine welder 100 to internally parallel multiple welding outputs together. Such switches can be costly and prone to failure (i.e., have relatively low reliability). Such paralleling configurations can also limit the welding outputs to using the same polarity since they are to be combined. In accordance with embodiments of the present invention, polarity is generated independently for each welding output because each welding output is derived from a different welding winding, rectifier, and output control circuit.

The second stator welding winding 132 is smaller and uses less conductive material (e.g., copper) than the first stator welding winding 131, in accordance with an embodiment of the present invention. Furthermore, the rectifier circuit 150 and the output control circuit 170 are not as large as (e.g., use less silicon material than) the rectifier circuit 140 and the output control circuit 160. As a result, the full or maximum electrical power capacity of the engine welder 100 is not able to be supplied to the second stator welding winding 132 and, therefore, is not able to be used at the second welding output 171. However, in accordance with an embodiment of the present invention, the second stator welding winding 132, the rectifier circuit 150, and the output control circuit 170 are capable of handling a large enough portion of the full or maximum electrical power capacity of the engine welder 100 (e.g., about 50%) in order for a user of the second welding output 171 to be able to perform many useful welding processes.

As an example, the first welding output 161 provides about 20 KW of welding output power, which corresponds to the maximum or full electrical power capacity of the engine welder 100. The second welding output 172 provides up to 10 KW of welding output power, which corresponds to about half of the maximum or full electrical power capacity of the engine welder 100. As is described later herein, when the full electrical power capacity of the engine welder 100 is being supplied to the first welding output 161, there is essentially no power capacity left to be supplied to the second welding output 171 or to the auxiliary power output 181. However, the full or maximum electrical power capacity of the engine welder 100 may be distributed among the various welding and auxiliary outputs. FIGS. 3-6 illustrate various methods of distributing electrical power.

Figure 3:
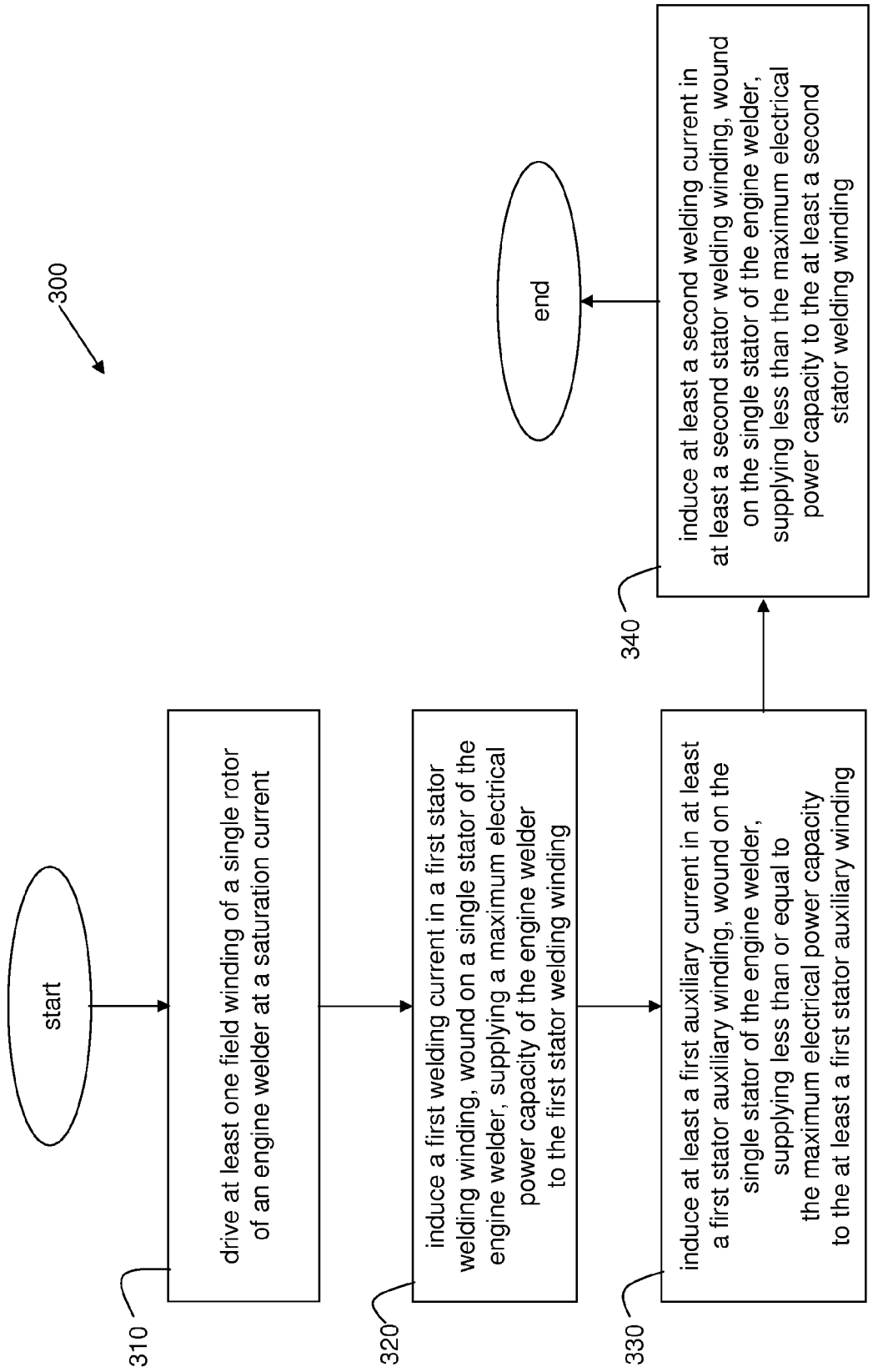
FIG. 3 illustrates a flow chart of a first example embodiment of a method of supplying electrical power capacity using the engine welder of FIG. 1 and FIG. 2.

FIG. 3 illustrates a flow chart of a first example embodiment of a method 300 of supplying electrical power capacity using the engine welder 100 of FIG. 1 and FIG. 2. In step 310, drive at least one field winding of a single rotor 120 of an engine welder 100 at a saturation current level. In step 320, induce a first welding current in first stator welding winding 131, wound on a single stator 130 of the engine welder 100, supplying a maximum electrical power capacity (e.g., 20 KW) of the engine welder 100 to the first stator welding winding 131. In step 330, induce at least a first auxiliary current in at least a first stator auxiliary winding 133, wound on the single stator 130 of the engine welder 100, supplying less than or equal to the maximum electrical power capacity to the at least a first stator auxiliary winding 133. In step 340, induce at least a second welding current in at least a second stator welding winding 132, wound on the single stator 130 of the engine welder 100, supplying less than the maximum electrical power capacity to the at least a second stator welding winding 132.

The method 300 illustrates how, first, the full electrical power capacity may be used at the first welding output 161, second, how the full (or less than full) electrical power capacity may be used at the auxiliary power output 181 and, third, how less than the full electrical power capacity may be used at the second welding output 171. Of course, steps 320, 330, and 340 cannot be performed simultaneously since, if the full electrical power capacity is being supplied to the first stator welding winding 131 and used at the first welding output 161, then there is no electrical power capacity remaining to be used by the auxiliary power output 181 or the second welding output 171.

In general, electrical power capacity may be distributed across the various welding and auxiliary outputs up to and not exceeding the maximum or full electrical power capacity of the engine welder 100. However, the full or maximum electrical power capacity can be supplied to the first stator welding winding 131 to be used at the first welding output 161, but not to the second stator welding winding 132 to be used at the second welding output 171. Also, in accordance with an embodiment of the present invention, the full or maximum electrical power capacity can be supplied to the first stator auxiliary winding 133 to be used at the auxiliary power output 181. In other embodiments, less than the full electrical power capacity can be supplied to the first stator auxiliary winding 133.

If loads (e.g., welding tools, power tools) are ever connected to the various welding or auxiliary outputs such that the loads want to draw more than the maximum electrical power capacity of the engine welder 100, the engine welder 100 will bog down and not be able to provide more than the full electrical power capacity. Therefore, performance of the various connected welding tools and/or the power tools will be degraded.

Figure 4:
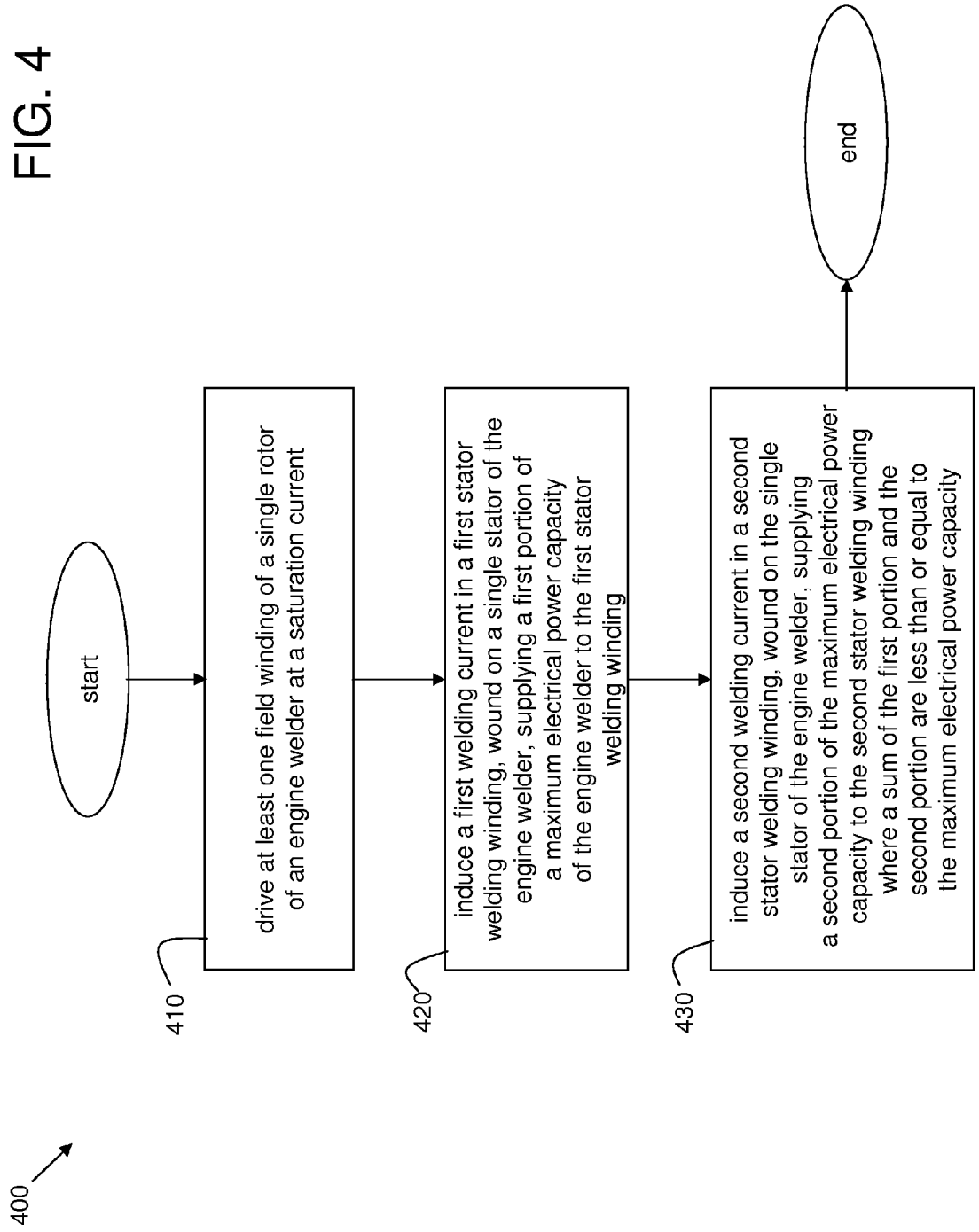
FIG. 4 illustrates a flow chart of a second example embodiment of a method of supplying electrical power capacity using the engine welder of FIG. 1 and FIG. 2.

FIG. 4 illustrates a flow chart of a second example embodiment of a method 400 of supplying electrical power capacity using the engine welder 100 of FIG. 1 and FIG. 2. In step 410, drive at least one field winding of a single rotor 120 of an engine welder 100 at a saturation current level. In step 420, induce a first welding current in a first stator welding winding 131, wound on a single stator 130 of the engine welder 100, supplying a first portion of a maximum electrical power capacity of the engine welder 100 to the first stator welding winding 131. In step 430, induce a second welding current in a second stator welding winding 132, wound on the single stator 130 of the engine welder 100, supplying a second portion of the maximum electrical power capacity to the second stator welding winding 132, where a sum of the first portion and the second portion are less than or equal to the maximum electrical power capacity. Steps 420 and 430 can be performed simultaneously since the sum of the first portion of electrical power and the second portion of electrical power do not exceed the maximum electrical power capacity of the engine welder 100. That is, two users can weld at the same time.

Figure 5:
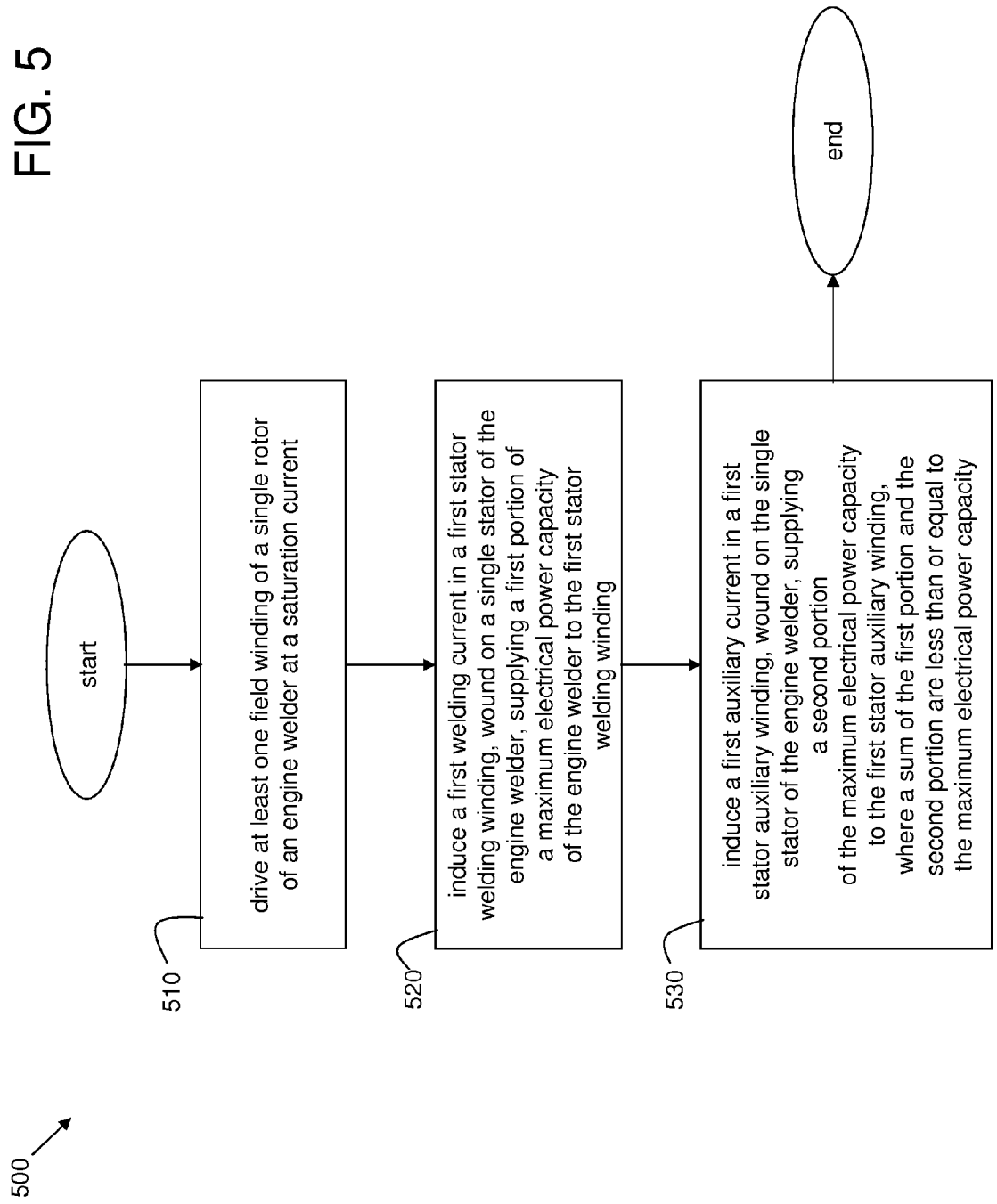
FIG. 5 illustrates a flow chart of a third example embodiment of a method of supplying electrical power capacity using the engine welder of FIG. 1 and FIG. 2.

FIG. 5 illustrates a flow chart of a third example embodiment of a method 500 of supplying electrical power capacity using the engine welder 100 of FIG. 1 and FIG. 2. In step 510, drive at least one field winding of a single rotor 120 of an engine welder 100 at a saturation current level. In step 520, induce a first welding current in a first stator welding winding 131, wound on a single stator 130 of the engine welder 100, supplying a first portion of a maximum electrical power capacity of the engine welder 100 to the first stator welding winding 131. In step 530, induce a first auxiliary current in a first stator auxiliary winding 133, wound on the single stator 130 of the engine welder 100, supplying a second portion of the maximum electrical power capacity to the first stator auxiliary winding 133, where a sum of the first portion and the second portion are less than or equal to the maximum electrical power capacity. Steps 520 and 530 can be performed simultaneously since the sum of the first portion of electrical power and the second portion of electrical power do not exceed the maximum electrical power capacity of the engine welder 100. That is, one user can weld while another user uses, for example, a power tool.

Figure 6:
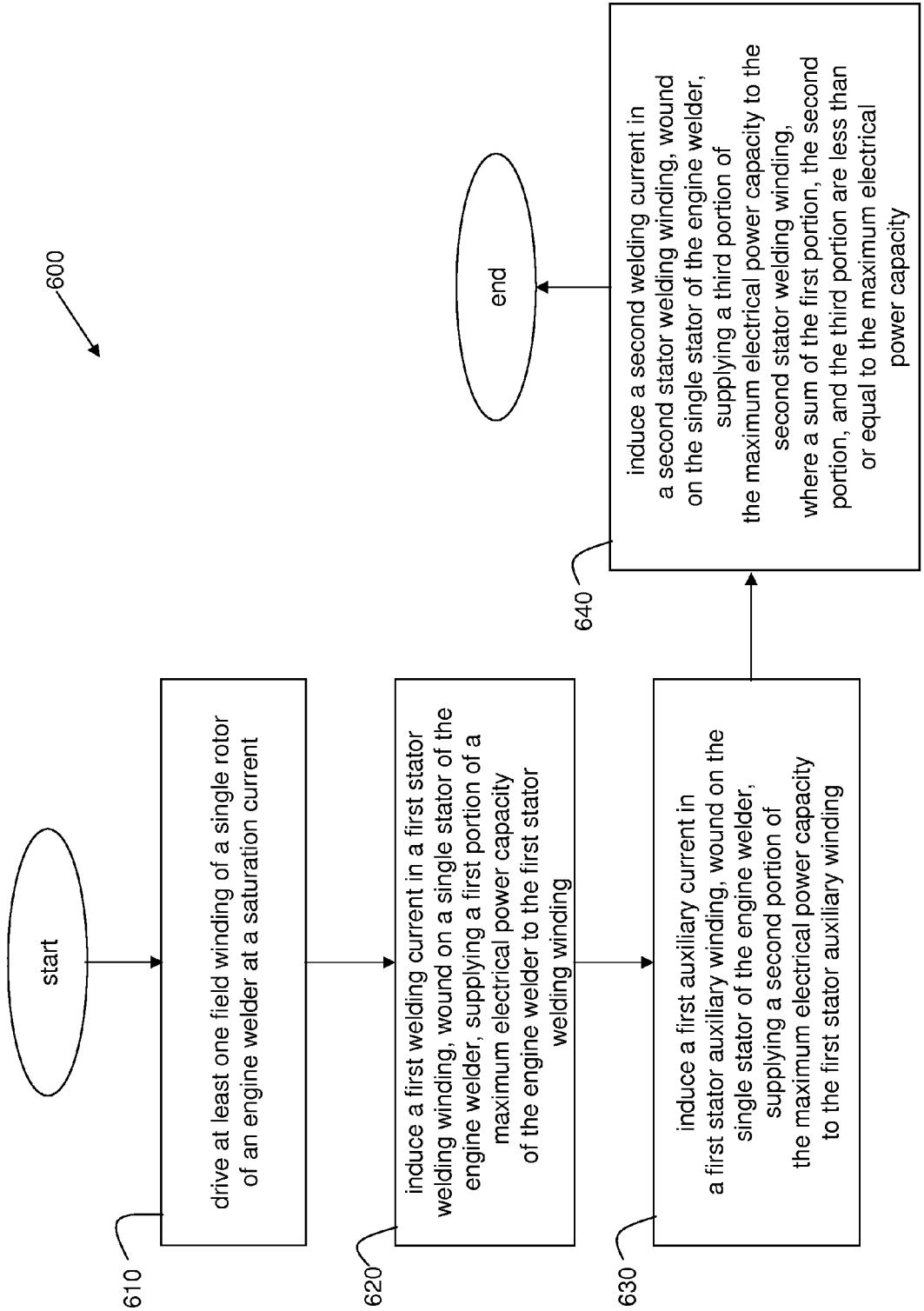
FIG. 6 illustrates a flow chart of a fourth example embodiment of a method of supplying electrical power capacity using the engine welder of FIG. 1 and FIG. 2.

FIG. 6 illustrates a flow chart of a fourth example embodiment of a method 600 of supplying electrical power capacity using the engine welder 100 of FIG. 1 and FIG. 2. In step 610, drive at least one field winding of a single rotor 120 of an engine welder 100 at a saturation current level. In step 620, induce a first welding current in a first stator welding winding 131, wound on a single stator 130 of the engine welder 100, supplying a first portion of a maximum electrical power capacity of the engine welder 100 to the first stator welding winding 131. In step 630, induce a first auxiliary current in a first stator auxiliary winding 133, wound of the single stator 130 of the engine welder 100, supplying a second portion of the maximum electrical power capacity to the first stator auxiliary winding 133. In step 640, induce a second welding current in a second stator welding winding 132, wound on the single stator 130 of the engine welder 100, supplying a third portion of the maximum electrical power capacity to the second stator welding winding 132, where a sum of the first portion, the second portion, and the third portion are less than or equal to the maximum electrical power capacity. Steps 620, 630, and 640 can be performed simultaneously since the sum of the first portion of electrical power, the second portion of electrical power, and the third portion of electrical power do not exceed the maximum electrical power capacity of the engine welder 100. That is, two users can weld while another user uses, for example, a power tool.

In summary, an engine welder having a single rotor and a single stator and methods of distributing electrical power capacity of the engine welder to various welding windings and auxiliary windings of the engine welder are disclosed. Means for supplying the full electrical power capacity of the engine welder to a single stator welding winding are provided. Furthermore, means for distributing the electrical power capacity of the engine welder between welding windings and/or auxiliary windings of the single stator are provided.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. An engine welder capable of supplying up to a full electrical power capacity, said engine welder comprising:
   an engine capable of providing rotating mechanical drive power;
   a single rotor having at least one field winding wound on a stack of iron laminations configured to be electrically driven at a saturation current which fully saturates a generator magnetics of the engine welder;
   a rotatable drive shaft operatively connecting said rotor to said engine; and
   a single stator surrounding said single rotor and having a first stator welding winding, at least a second stator welding winding, and at least a first stator auxiliary winding, wherein said engine, said single rotor, and said single stator are configured to supply said full electrical power capacity to said first stator welding winding as said rotor is driven at said saturation current.

2. The engine welder of claim 1 wherein said engine, said single rotor, and said single stator are further capable of supplying less than said full electrical power capacity to said at least a second stator welding winding.

3. The engine welder of claim 1 wherein said engine, said single rotor, and said single stator are further capable of supplying at least a portion of said full electrical power capacity to said at least a first stator auxiliary winding.

4. The engine welder of claim 1 further comprising a first rectifier circuit operatively connected to an output of said first stator welding winding and at least a second rectifier circuit operatively connected to an output of said at least a second stator welding winding.

5. The engine welder of claim 1 wherein said at least a first stator auxiliary winding provides a single phase auxiliary power.

6. The engine welder of claim 1 wherein said at least a first stator auxiliary winding provides a three phase auxiliary power.

7. The engine welder of claim 4 further comprising a first output control circuit operatively connected to an output of said first rectifier circuit and capable of controlling a first welding output current over a full range of welding output current levels up to said full electrical power capacity of said engine welder.

8. The engine welder of claim 7 further comprising at least a second output control circuit operatively connected to an output of said at least a second rectifier circuit and capable of controlling a second welding output current over a full range of welding output current levels, independently of said first welding output current, up to less than said full electrical power capacity of said engine welder.

9. The engine welder of claim 8 wherein said first output control circuit includes at least one chopper circuit, and said at least a second output control circuit comprises at least one chopper circuit.

10. The engine welder of claim 8 wherein said first output control circuit includes at least one inverter circuit, and said at least a second output control circuit includes at least one inverter circuit.

11. The engine welder of claim 7 wherein said first output control circuit is capable of controlling said first welding output current at a control rate of greater than 18 KHz over said full range of welding output current levels.

12. The engine welder of claim 8 wherein said at least a second output control circuit is capable of controlling said second welding output current at a control rate of greater than 18 KHz over said full range of welding output current levels.

13. An engine welder capable of supplying up to a maximum electrical power capacity, said engine welder comprising:
   first welding output means;
   at least second welding output means;
   at least first auxiliary power output means; and
   means for supplying said maximum electrical power capacity to said first welding output means via a first stator welding winding and via a single rotor of the engine welder having at least one field winding wound on a stack of iron laminations configured to be driven at a saturation current to fully saturate a generator magnetics of the engine welder.

14. The engine welder of claim 13 further comprising means for supplying less than said maximum electrical power capacity to said at least second welding output means.

15. The engine welder of claim 13 further comprising means for simultaneously supplying a first portion of said maximum electrical power capacity to said first welding output means and a second portion of said maximum electrical power capacity to said at least a second welding output means, where the sum of said first portion and said second portion are less than or equal to said maximum electrical power capacity.

16. The engine welder of claim 13 further comprising means for simultaneously supplying a first portion of said maximum electrical power capacity to said first welding output means and a second portion of said maximum electrical power capacity to said at least a first auxiliary power output means, where the sum of said first portion and said second portion are less than or equal to said maximum electrical power capacity.

17. The engine welder of claim 13 further comprising means for simultaneously supplying a first portion of said maximum electrical power capacity to said first welding output means, a second portion of said maximum electrical power capacity to said at least a second welding output means, and a third portion of said maximum electrical power capacity to said at least a first auxiliary power output means, where the sum of said first portion, said second portion, and said third portion are less than or equal to said maximum electrical power capacity.

18. The engine welder of claim 13 further comprising means for controlling an output current of said first welding output means over a full range of output current levels up to said maximum electrical power capacity.

19. The engine welder of claim 13 further comprising means for controlling an output current of said at least a second welding output means over a full range of output current levels up to less than said maximum electrical power capacity.

20. The engine welder of claim 13 wherein said at least a first auxiliary power output means provides a single phase auxiliary power.

21. The engine welder of claim 13 wherein said at least a first auxiliary power output means provides a three phase auxiliary power.

22. A method of supplying a maximum electrical power capacity with an engine welder having a single rotor capable of rotating within a single stator, said method comprising:
driving at least one field winding wound on a stack of iron laminations of said single rotor at a saturation current to fully saturate a generator magnetics of the engine welder;
inducing a first welding current in a first stator welding winding, wound on said single stator of said engine welder, supplying said maximum electrical power capacity to said first stator welding winding;
inducing at least a first auxiliary current in at least a first stator auxiliary winding, wound on said single stator of said engine welder, supplying less than or equal to said maximum electrical power capacity to said at least a first stator auxiliary winding; and
inducing at least a second welding current in at least a second stator welding winding, wound on said single stator of said engine welder, supplying less than said maximum electrical power capacity to said at least a second stator welding winding.

23. The method of claim 22 further comprising inducing said first welding current in said first stator welding winding supplying a first portion of said maximum electrical power capacity while simultaneously inducing said at least a second welding current in said at least said second stator welding winding supplying a second portion of said maximum electrical power capacity, where a sum of said first portion and said second portion are less than or equal to said maximum electrical power capacity.

24. The method of claim 22 further comprising inducing said first welding current in said first stator welding winding supplying a first portion of said maximum electrical power capacity while simultaneously inducing said at least a first auxiliary current in said at least a first stator auxiliary winding supplying a second portion of said maximum electrical power capacity, where a sum of said first portion and said second portion are less than or equal to said maximum electrical power capacity.

25. The method of claim 22 further comprising inducing said first welding current in said first stator welding winding supplying a first portion of said maximum electrical power capacity, while simultaneously inducing said at least a second welding current in said at least said second stator welding winding supplying a second portion of said maximum electrical power capacity, while simultaneously inducing said at least a first auxiliary current in said at least a first stator auxiliary winding supplying a third portion of said maximum electrical power capacity, where a sum of said first portion, said second portion, and said third portion are less than or equal to said maximum electrical power capacity.

26. The method of claim 22 further comprising controlling a first welding output current, derived from said first welding current, over a full range of welding output current levels up to said maximum electrical power capacity while said single rotor of said engine welder is driven at said saturation current.

27. The method of claim 22 further comprising controlling a first welding output current, derived from said first welding current, over a full range of welding output current levels up to less than said maximum electrical power capacity while said single rotor of said engine welder is driven at said saturation current.

28. The method of claim 27 further comprising controlling at least a second welding output current, derived from said at least a second welding current, over a full range of welding output current levels up to less than said maximum electrical power capacity while said single rotor of said engine welder is driven at said saturation current.

* * * * *